July 22, 1952  S. S. BARKER  2,603,830
FINGER FOR CHICKEN PICKERS
Filed Sept. 4, 1948
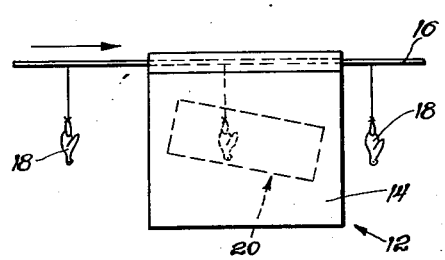
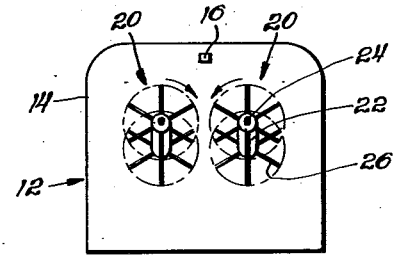
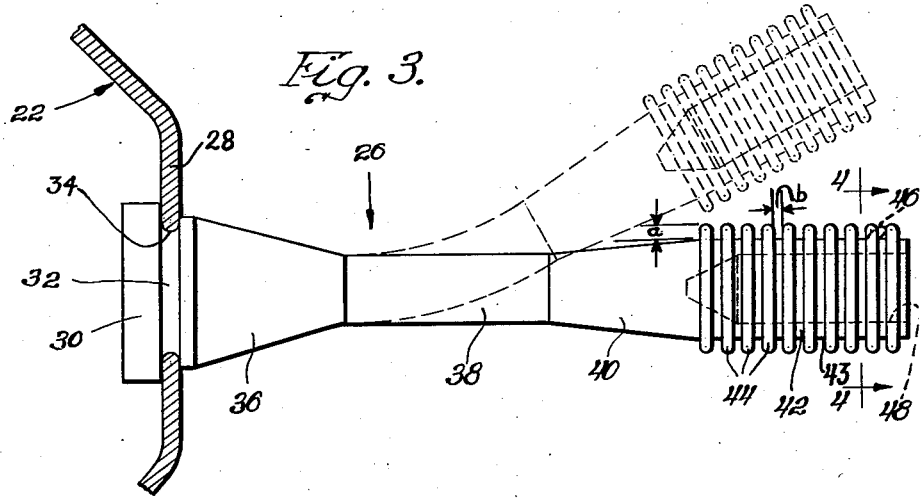
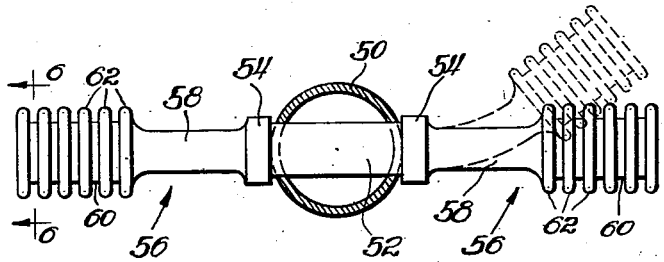
Inventor:
Seth S. Barker
By Bair & Freeman
Attys Patented July 22, 1952

2,603,830

UNITED STATES PATENT OFFICE 2,603,830

FINGER FOR CHICKEN PICKERS

Seth S. Barker, Ottumwa, Iowa, assignor to Barker Poultry Equipment Company, Ottumwa, Iowa, a corporation of Iowa Application September 4, 1948, Serial No. 47,769

3 Claims. (Cl. 17—11.1)

This invention relates to a new and improved picking finger for use in poultry-picking machines.

Commercial poultry picking is now customarily done by means of machines having a pair of rotating drums on which are mounted a plurality of radially extending fingers. The poultry is placed between the drums, and as the drums rotate, the fingers engage the poultry and remove the feathers therefrom.

Such fingers are of resilient material, usually rubber. Heretofore, such machines were of the type which relied on a rubbing action of the fingers on the poultry, that is, as the drums rotate over the fowl, the fingers sweep and rub over the surface of the fowl.

Objection to previously known machines is that rubbing action has limitations. The pressure applied to the fingers in engaging the fowl must, of course, be such as to remove the feathers therefrom, but when a certain point of pressure was reached the fingers caused barking of the skin. Below a certain pressure, the fingers were ineffective for removing feathers, and above a certain pressure barking occurred. The range between these two pressures has been quite limited and extraordinary skill was required to maintain the pressure of the fingers on the fowl between those two pressures.

An object of the present invention is the provision of a novel construction of finger which can be used in machines of the type above described and whereby increased pressure can be applied in the picking operation without injury to the skin.

An advantage of being able to impart increased pressures is that increased speeds can be attained which, of course, is advantageous in conducting commercial picking process more speedily. In previous machines, the speeds at which fowl or poultry could be picked were limited because the pressures at which the fingers could be applied to the fowl were limited.

Another object of the present invention is the provision of a picking finger which possesses a novel construction and by virtue of which a striking action on the fowl is brought about and the rubbing action present in previous machines is virtually eliminated.

Essentially, the picking finger of the present invention consists of a stretchable and elastic finger which has a weak portion intermediate its ends and a heavier portion at its outer end. By reason of this novel construction, the outer end of the finger, when the finger is rotated on a drum, flies out by centrifugal force and strikes the fowl. In this action, the weak portion is stretched and when the outer, heavier portion strikes the fowl, the centrifugal force is lost and the weak section then recovers its original length at the moment of greatest pressure of the finger on the fowl. Thereafter, the finger does not gather sufficient centrifugal force, within the range of the fowl, to cause serious rubbing action thereon.

A further object of the invention is the provision of a novel picking finger having circumferential ribs which extend radially outwardly from the fingers a distance at least as great as the distance between adjacent surfaces of adjacent ribs. By virtue of such an arrangement, when the finger strikes the fowl, the ribs are flexed or pinched over against one another and grip the feathers therebetween; at this point the centrifugal force of the finger is lost, and the weak section of the finger recovers its original length as explained above, and as it does so, the outer end is given a short quick pull, which pulls out the feathers gripped between the ribs.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 1 is a diagrammatic view from the side of a poultry picking machine.

Figure 2 is a diagrammatic end view of the machine.

Figure 3 is an enlarged detailed view of one form of finger made according to present invention.

Figure 4 is a sectional view taken on line 4—4 of Figure 3.

Figure 5 is an enlarged detailed view of another form of picking finger.

Figure 6 is a sectional view taken on line 6—6 of Figure 5.

Referring now in detail to the drawings, Figures 1 and 2 show a poultry-picking machine in which the novel picking finger of the present invention may be employed. The machine is indicated as a whole by the reference numeral 12 and includes a shell or tunnel 14, open at both ends. A conveyor is indicated at 16 and extends through the machine 12. A number of fowl 18 are suspended from the conveyor 16 and are carried through the machine 12; for example, from left to right in Figure 1.

Picking drums are indicated at 20 and are illustrated only diagrammatically. Each picking drum 20 includes a central cylinder 22 having a shaft 24 for mounting the drum in the machine 12. Preferably, the drums 20 are disposed in an inclined position with their upper ends toward the entrance of the machine.

Each picking drum 20 includes a plurality of picking fingers 26 which extend radially outwardly from the cylinder 22. The fingers 26 are arranged in longitudinal rows on the drum and there are a number of such rows spaced circumferentially around the drum so that in the final completed drum there are a large number of fingers. The drums 20 are rotated in opposite directions so that as the fowl pass between the drum the fingers engage the fowl from all sides.

Figure 3 illustrates a finger 26 which forms one embodiment of the present invention and a number of which are employed as described in connection with Figure 2. A fragment of the cylinder 22 is illustrated. Although the cylinder 22 is generally cylindrical, it is provided with a flat portion 28 for securement of the fingers 22 thereon. The finger is formed of stretchable elastic material, such as rubber. The finger, at its inner end, has an enlarged portion 30 forwardly of which is a circumferential groove 32. The portion 28 of the cylinder 22 is provided with a hole 34, in which the finger is secured to the cylinder. Outwardly of the groove 32 is a tapered portion 36 of which the greatest diameter is larger than the groove 32, but smaller than the enlarged portion 30. Outwardly of the tapered portion 36 is an intermediate shank portion 38 which is of lesser transverse dimension than any part of the inner end of the finger and has less mass per unit length thereof. Outwardly of the central reduced, or weak, portion 38 is another tapered portion 40 which enlarges outwardly, terminating in an outer end portion 42. The outer end portion 42 is generally uniform longitudinally, but is provided with a plurality of circumferential ribs 44 spaced axially thereon. The ribs 44 extend radially outwardly a distance $a$ beyond the periphery 43 of the finger an extent at least as great as the distance $b$ between adjacent surfaces of adjacent ribs. The ribs 44 are adapted to flex over and engage the adjacent rib on either side as indicated at 46. Formed in the outer end of the outer portion 42 is a cavity 48 for reducing the mass of the outer end of the finger. The finger 26 is inserted in the opening 34 by stretching the finger to reduce its diameter, whereby the outer end and the tapered portion 36 can be inserted therethrough. Upon release of the stretching force, the margin of the opening 34 fits in the groove 32.

Figure 5 illustrates another embodiment of the present invention and comprises a double finger or opposite-extending single fingers, secured to a common base portion. A cylinder 50 is employed for mounting the double finger. The cylinder 50 is of considerably less diameter than the cylinder 22 used in connection with the previous finger; the purpose of the smaller dimension cylinder 50 will be described later.

The double finger illustrated in Figure 5 is also made of resilient material which is stretchable and elastic. The double finger includes a central portion 52 which is generally cylindrical and is preferably uniform throughout its length. At each end of the central portion 52 is an enlarged circumferential abutment 54 considerably larger in diameter than the central portion 52. The central portion 52 and the abutments 54, together, form the means for securing the double finger to the supporting member or cylinder 50.

A single finger 56 extends outwardly from each end of the central portion and both fingers are identical in construction and, therefore, a description of one will suffice for both. Each finger 50 includes an intermediate portion 58 which is preferably cylindrical and elongated. The intermediate portion 58 is of less diameter and of less mass per unit length than the central portion 52. Outwardly of the intermediate portion 58 is an outer portion 60 which is preferably solid in construction. A plurality of circumferential ribs 62 are provided on the outer end portion 60 and are spaced axially therealong. As in the case of the previous embodiment, the ribs 62 extend radially outwardly from the periphery of the finger a distance at least as great as the distance between adjacent surfaces of adjacent ribs. The intermediate portion 58 of each finger merges relatively abruptly into the outer end portion and into the abutment 54.

The cylinder 50 is provided with diametrically aligned holes and in inserting the double finger therein the finger is stretched so that the outer end portion and the abutment 54 are reduced in transverse dimension and can readily be inserted therethrough. As the double finger is centered, it recovers its original shape and the abutments 54 secure the fingers in the cylinder.

Picking action of the finger

In connection with the finger illustrated in Figure 3, the outer end 42 is of greater mass per unit length than the central portion 38 which is also considered a weak portion. As the drum rotates with considerable speed the centrifugal force developed throws the outer heavy end of the finger outwardly and since the intermediate portion 38 is weaker, the finger stretches in this portion. As the finger strikes the fowl, its centrifugal force is lost, and the weak intermediate section 38 then recovers its original shape while the finger is in contact with the fowl. The outer end of the finger is thereby given a short quick jerk.

When the finger strikes the fowl, as just described, the ribs flex over against one another and pinch the feathers therebetween. This is made possible by the fact that the ribs have a radial extent at least as great as the distance between the ribs. When the finger is given a snap or jerk, it pulls out the feathers which are pinched between the ribs.

The finger bounces off the fowl, and as the drum continues to rotate, the finger is carried across the fowl, but the finger does not regain sufficient momentum or centrifugal force to rub with any appreciable pressure on the fowl, the finger has lost its original momentum, and the length of the fowl is so short that the finger cannot fly out again within the range of the fowl. The finger may drag across the fowl, but this action is not considered rubbing, at least with such pressure as would cause barking of the skin.

Thus the picking action consists essentially in striking, with objectionable rubbing eliminated.

I wish to point out an important feature at this point: the skin of a fowl is somewhat loose and moves with respect to the flesh to a certain extent. If a picking finger strikes the fowl, and moves or rubs a distance no greater than the distance which skin moves on the flesh, the finger does not actually move over the surface of the skin. The length of the short snap or jerk given the finger, as in the present invention as explained above, is within the range of movement of the skin with respect to the flesh.

I have found that by providing the cavity 48 in the outer end of the finger, the mass of the outer end can be determined by the size of the cavity. It will be evident, however, that the total mass of the outer end portion 42 and the tapered portion 40 is greater per unit length than of the intermediate portion 38. It is also true that the intermediate portion 38 is of less mass per unit length than the inner end portion of the finger which includes the tapered portion 36 and the enlarged portion 30. Thus, when centrifugal action is developed, the finger stretches in the intermediate section 38.

The finger illustrated in Figure 3 is intended to be used in picking the body of the fowl and is of sufficient length that when a number of them are applied to the fowl they reach substantially all parts of the fowl.

In the double finger illustrated in Figure 5, each single finger is considerably smaller than the finger of Figure 3. The double finger of Figure 5 is intended to be employed for removing the garter feathers from the fowl and because of the restricted areas of operation the length of the finger and the diameter of the cylinder supporting them are of lesser dimension. The double finger of Figure 5, therefore, furnishes a convenient means for securing or mounting fingers on a small diameter cylinder.

Each single finger of Figure 5 is essentially the same as the finger of Figure 3, but is varied in detail. The intermediate portion 58 of each finger is of less mass per unit length than the central portion 52 and it is also, of course, of less mass than the abutment 54. The intermediate portion 58 is also of less mass per unit length than the outer portion 60. Thus, when the drum or cylinder 50 rotates, the centrifugal force causes the outer end of the finger to fly out and the finger stretches in the weak portion 58. Stretching of the central portion 52 is prevented because of the fact that it is heavier than the portion 58. The action of the ribs 62 is the same as described in connection with the ribs 44. The fingers 56 of Figure 5 are not provided with cavities such as in the finger 26, but it is understood that such cavities may be employed for the purpose of providing the correct proportions of mass between the outer end and the intermediate portion 58.

While I have herein shown and described certain embodiments of my invention, manifestly they are susceptible of modification without departing from the spirit and scope thereof. I do not, therefore, wish to be understood as limiting my invention to the precise forms herein disclosed, except as I may be so limited by the appended claims.

I claim as my invention:

1. An elongated and elastic poultry picking finger comprising a base portion adapted for securement to a rotatable supporting member, an intermediate shank portion, and a cylindrical outer end portion, said intermediate shank portion being of lesser outer transverse dimension and lesser cross sectional area than both said base portion and said outer end portion, whereby said intermediate shank portion stretches longitudinally by centrifugal force upon rotation of said supporting member more easily than both of said other portions, and whereby said intermediate shank portion bends transversely more easily than both of said other portions, and a plurality of axially spaced circumferential ribs on said outer end portion extending radially therefrom, all of said ribs extending beyond the cylindrical periphery of the outer end portion of the finger a distance at least as great as the distance between adjacent surfaces of adjacent ribs.

2. A poultry picking finger as set forth in claim 1 wherein both the base portion and the outer end portion taper over a portion of their length into said intermediate shank portion.

3. A poultry picking finger as set forth in claim 1 wherein said outer end portion has an axial cavity formed in the outer end thereof.

SETH S. BARKER.

REFERENCES CITED

The following references are of record in the file of this patent:

UNITED STATES PATENTS

| Number | Name | Date |
|---|---|---|
| 286,032 | Mason, Jr. | Oct. 2, 1883 |
| 2,039,716 | Horton | May 5, 1936 |
| 2,271,551 | Hoover | Feb. 3, 1942 |
| 2,300,157 | Hunt | Oct. 27, 1942 |
| 2,362,371 | Haist | Nov. 7, 1944 |
| 2,376,120 | Campbell et al. | May 15, 1945 |
| 2,412,108 | Toti et al. | Dec. 3, 1946 |
| 2,422,603 | Albright | June 17, 1947 |

FOREIGN PATENTS

| Number | Country | Date |
|---|---|---|
| 116,500 | Australia | Jan. 27, 1943 |